US012458175B2

(12) United States Patent
Hawkins et al.

(10) Patent No.: US 12,458,175 B2
(45) Date of Patent: Nov. 4, 2025

(54) SYSTEMS FOR STAND MIXER BOWL LIFTING

(71) Applicant: Haier US Appliance Solutions, Inc., Wilmington, DE (US)

(72) Inventors: Mason Hawkins, Louisville, KY (US); Matthew R. Hunter, Louisville, KY (US); Danister Abeygunawardana, Jeffersonville, IN (US); Tomas Garces, Louisville, KY (US); Eric Matthew Lewis, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 586 days.

(21) Appl. No.: 17/882,798

(22) Filed: Aug. 8, 2022

(65) Prior Publication Data
US 2024/0041261 A1 Feb. 8, 2024

(51) Int. Cl.
*A47J 43/07* (2006.01)
*A47J 43/044* (2006.01)

(52) U.S. Cl.
CPC ......... *A47J 43/0705* (2013.01); *A47J 43/044* (2013.01); *A47J 2043/04463* (2013.01)

(58) Field of Classification Search
CPC ........... B01F 27/805; A47J 2043/04472; A47J 43/0705
See application file for complete search history.

(56) References Cited

U.S. PATENT DOCUMENTS

| 2,020,450 | A | * | 11/1935 | Andis | B01F 27/805 366/199 |
| 2,339,439 | A | | 1/1944 | Tone | |
| 2,626,133 | A | * | 1/1953 | Reed | A23G 9/28 366/206 |
| 4,500,210 | A | * | 2/1985 | Vilen | A21C 1/02 366/279 |
| 5,860,738 | A | * | 1/1999 | Brinkman | A21C 1/02 411/395 |
| 6,062,725 | A | | 5/2000 | Paturel et al. | |
| 6,435,708 | B1 | * | 8/2002 | Huang | B01F 35/60 99/348 |
| 10,799,072 | B2 | | 10/2020 | Ambrose et al. | |

(Continued)

FOREIGN PATENT DOCUMENTS

DE 3912361 A1 10/1990
JP H0775517 B2 * 8/1995
(Continued)

*Primary Examiner* — Marc C Howell
(74) *Attorney, Agent, or Firm* — Dority & Manning, P.A.

(57) ABSTRACT

A stand mixer includes a base and a support column attached to the base, extending upwardly from the base. A bowl lift framework extends outwardly from the support column. The bowl lift framework includes at least one lift arm. The lift arm is pivotable relative to the support column. The lift arm rotates a first tension bar coupled to a linkage, and the linkage is rotatable about a lift pin. The linkage is also coupled to a second tension bar. A head is attached to an upper end of the support column and extends from the support column above the base. Also included in the stand mixer is a bowl. The bowl lift framework is configured for vertically moving the bowl relative to the head when the lift arm pivots relative to the support column.

18 Claims, 5 Drawing Sheets

(56) References Cited

U.S. PATENT DOCUMENTS

| | | | | |
|---|---|---|---|---|
| 2005/0249032 A1* | 11/2005 | Heinhold | ............ | B01F 27/9213 |
| | | | | 366/289 |
| 2007/0195641 A1* | 8/2007 | Schnipke | .............. | B01F 27/805 |
| | | | | 366/206 |
| 2009/0185443 A1* | 7/2009 | Blackburn | .......... | A47J 43/0727 |
| | | | | 366/261 |
| 2021/0393082 A1 | 12/2021 | Mock et al. | | |

FOREIGN PATENT DOCUMENTS

| | | |
|---|---|---|
| JP | 3219611 U | 1/2019 |
| KR | 101304328 B1 | 9/2013 |

\* cited by examiner

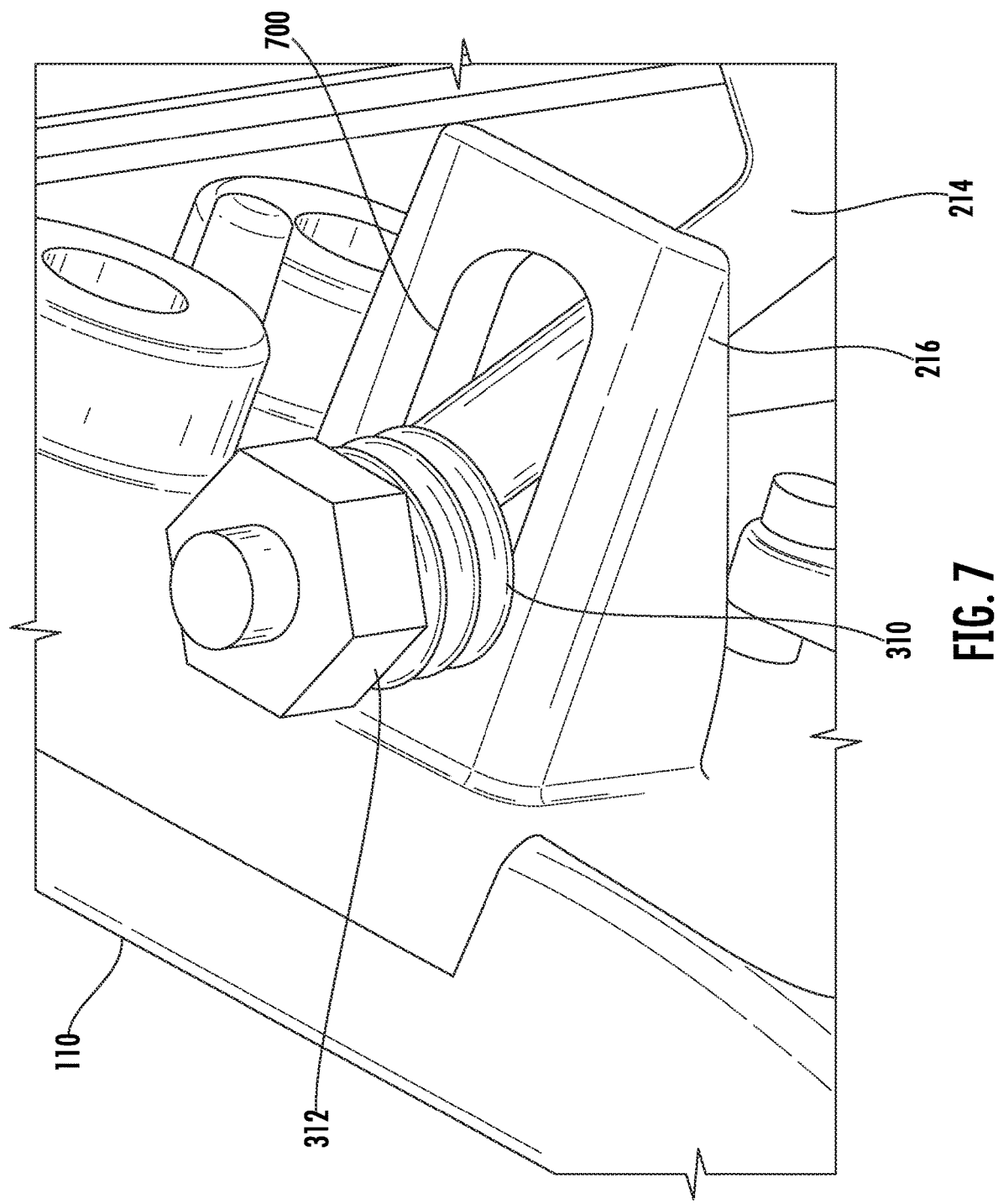

SYSTEMS FOR STAND MIXER BOWL LIFTING

FIELD OF THE INVENTION

The present subject matter relates generally to generally to stand mixers and bowl lifting mechanisms for stand mixers.

BACKGROUND OF THE INVENTION

Stand mixers are generally used for performing automated mixing, churning, or kneading involved in food preparation. Typically, stand mixers include a motor configured to provide torque to one or more driveshafts. Users may connect various utensils to the one or more driveshafts, including whisks, spatulas, or the like. When using the stand mixer, the contents of the bowl can become heavy and difficult to move or manage. When this occurs, it is beneficial to use a specialized mixer. One type of specialized mixer, for example, is a tilt-head mixer. The tilt-head mixer allows the user to tilt the head of the mixer to provide access to the opening of the bowl. Tilt-head mixers may be troublesome as the head of the mixer is typically heavy.

Another type of mixer is the bowl-lift mixer. Bowl-lift mixers include a bowl that can be lifted vertically by a lift system. Arms extending from the mixer support the bowl, and a lever or crank may be rotated to translate the mixing bowl up or down vertically. Using a bowl-lift mixer reduces the difficulty of moving the mixing bowl vertically relative to tilt-head mixers. However, bowl-lift mixers can take up more counterspace in the kitchen than tilt-head mixers, as bowl lift mixers typically have a larger footprint.

BRIEF DESCRIPTION OF THE INVENTION

Aspects and advantages of the invention will be set forth in part in the following description, or may be apparent from the description, or may be learned through practice of the invention.

In one example embodiment, a stand mixer includes a base and a support column attached to the base, extending upwardly from the base. A bowl lift framework extends outwardly from the support column. The bowl lift framework includes at least one lift arm. The lift arm is pivotable relative to the support column. The lift arm rotates a first tension bar coupled to a linkage, and the linkage is rotatable about a lift pin. The linkage is also coupled to a second tension bar. A head is attached to an upper end of the support column and extends from the support column above the base. Also included in the stand mixer is a bowl. The bowl lift framework is configured for vertically moving the bowl relative to the head when the lift arm pivots relative to the support column. The bowl is held between the lift arm of the bowl lift framework.

In another example embodiment, a stand mixer includes a base and a support column attached to the base, extending upwardly from the base. A column rail is mounted to the support column. A head is attached to an upper end of the support column and extends from the support column above the base. A bowl includes at least two flanges positioned on opposite sides of the bowl. A bowl lift framework extends outwardly from the column rail of the support column. The bowl lift framework further includes a bowl carrier slidably coupled to the column rail, and at least one lift arm rotatably mounted to the bowl carrier. The lift arm is pivotable relative to the support column. The lift arm rotates a first tension bar coupled to a linkage and the linkage is rotatable about a lift pin. The linkage is also coupled to a second tension bar. The bowl is removably mountable on the bowl carrier between the lift arm. The flanges of the bowl and the bowl carrier are configured to removably couple.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 7 provides a perspective, section view of a slide rail tab of the bowl lift framework of FIG. 2.

Figure 1:
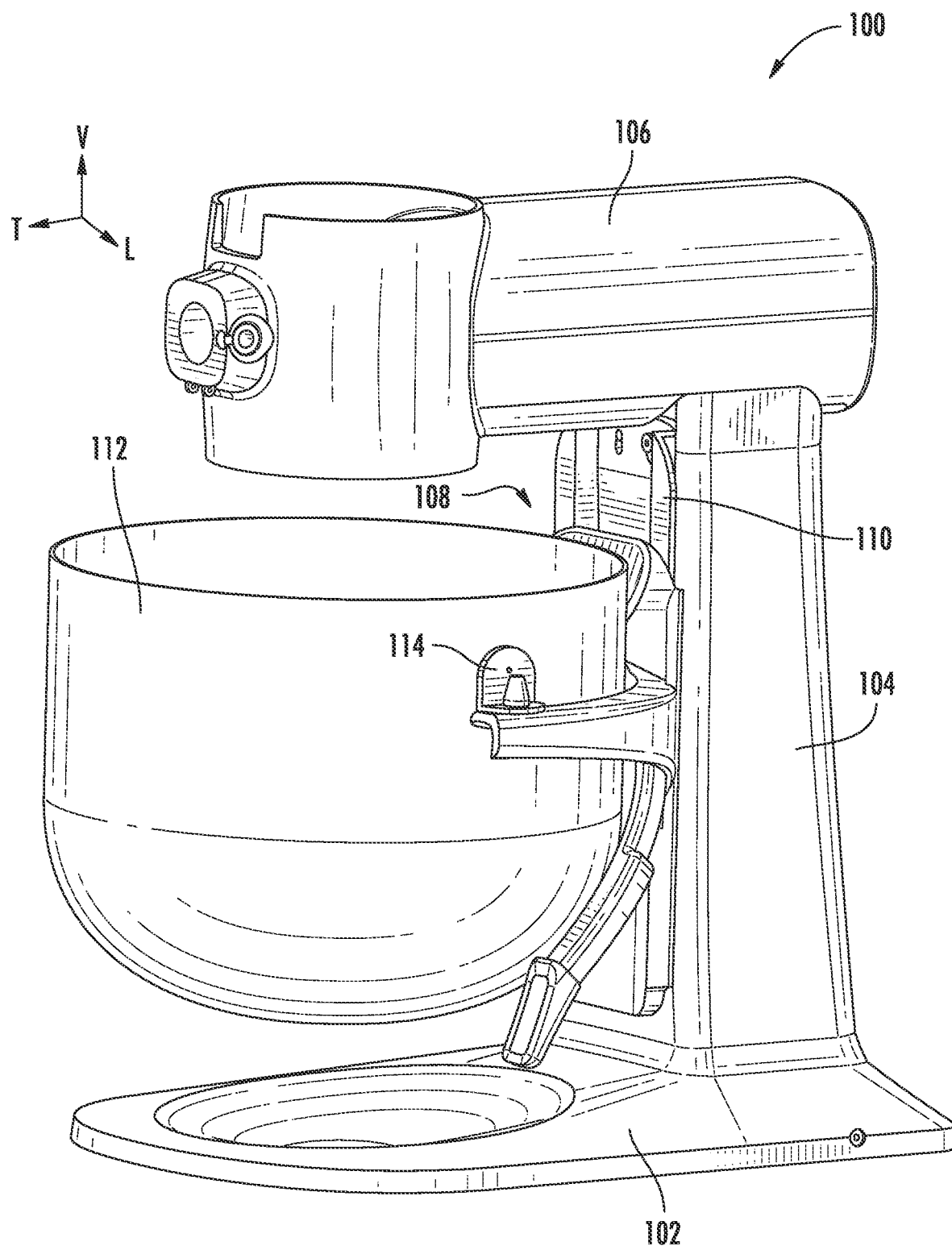
FIG. 1 provides an isometric perspective view of an example embodiment of a stand mixer of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides an isometric view of a stand mixer 100 according to an example embodiment of the present subject matter. It will be understood that stand mixer 100 is provided by way of example only and that the present subject matter may be used in or with any suitable stand mixer in alternative example embodiments. Moreover, with reference to each of FIGS. 1 and 2, stand mixer 100 may define a vertical direction V, a lateral direction L, and a transverse direction T, which are mutually perpendicular and form an orthogonal direction system. It should be understood that these directions are presented for example purposes only, and that relative positions and locations of certain aspects of stand mixer 100 may vary according to specific embodiments, spatial placement, or the like.

Stand mixer 100 may include a base 102 and a support column 104. Column 104 may support a mixer head 106, which is positioned atop column 104. Head 106 may house a motor, a gearbox, and/or a drivetrain apparatus (not shown) of stand mixer 100. For example, as shown in FIG. 1, head 106 may be mounted to column 104, which is mounted to base 102. Thus, column 104 may extend between and connect base 102 and head 106, e.g., along the vertical direction V. Head 106 may extend outwardly above the base 102, e.g., in the transverse direction T. Column 104 may also include a bowl lift framework 108. Bowl lift framework 108 may slidably mount to a slider rail 110, which is mounted to column 104. Additionally, components of bowl lift framework 108 may extend outwardly above the base 102, e.g., in the transverse direction T, and may hold bowl 112 above base 102, e.g., along the vertical direction V. Bowl 112 may be removably mounted on bowl lift framework 108 via flanges 114. Flanges 114 may be on opposite sides of the bowl 112 with respect to the circumference of the bowl. Bowl lift framework 108 will be described in further detail herein.

Example operation of stand mixer 100 is described below. In the operation of stand mixer 100, a user may load food items into bowl 112. The food items may be ingredients, such as flour, water, milk, etc. These items are provided for example purposes only and one skilled in the art would appreciate that there are many more types of food items that may be placed in bowl 112 of stand mixer 100. After loading the food items into bowl 112, a user may turn on a motor to begin the process of mixing, kneading, beating, etc. The motor rotates an attachment attached to stand mixer 100 to complete each of these processes. The processes may be conducted with a respective attachment, such as a mixer blade for mixing, a dough hook for kneading, and a balloon whisk for beating.

Figure 2:
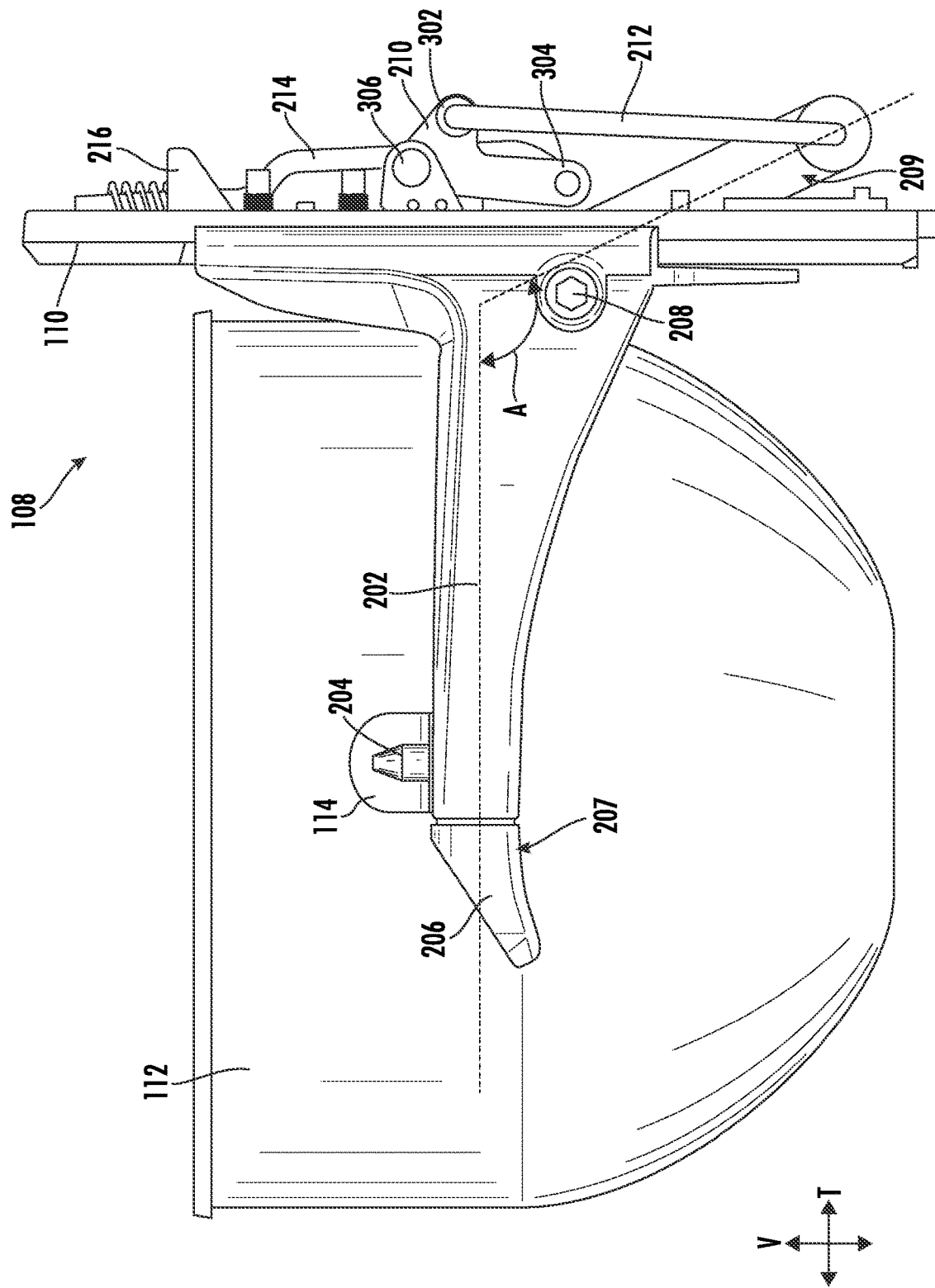
FIG. 2 provides a side, section view of a bowl lift framework of the example stand mixer of FIG. 1.

As shown in a side view in FIG. 2, bowl lift framework 108 may include a bowl carrier 202, e.g., with a mounting spike 204. Bowl 112 may be removably mounted on bowl lift framework 108 via flanges 114. Flanges 114 may be on opposite sides of the bowl 112 with respect to the circumference of the bowl. Bowl carrier 202 of bowl lift framework 108 may hold bowl 112 via mounting spike 204 engaging with flanges 114. For instance, each mounting spike 204 on bowl carrier 202 may be received within a respective flange 114 on bowl 112. Lift arm 206 may rotatably couple to bowl carrier 202 via a hinge pin 208. Hinge pin 208 may be a fixed rotational point with respect to bowl carrier 202, e.g., hinge pin 208 may not translate or move apart from bowl carrier 202.

There may be at least two lift arms 206, and bowl 112 may be disposed between lift arms 206, e.g., along the lateral direction L. Each lift arm 206 may be positioned on a respective side of bowl 112, such that both a left-handed user and a right-handed user may comfortably operate lift arms 206. When rotating lift arm 206, bowl carrier 202 may be translated in the vertical direction V by a linkage 210. Specifically, when rotating lift arm 206 about hinge pin 208, a first tension bar 212 pushes and rotates linkage 210 about the lateral L axis. In response to the rotation of linkage 210, a second tension bar 214 may be rotated through a slider rail tab 216. The operation of lift arm 206 to translate bowl 112 in the vertical direction V will be described in further detail herein.

Lift arm 206 may have one end 207 cantilevered from support column 104. Such distal end 207 may correspond to a handle for a user to grasp, push, or pull. The other end 209, e.g., an angled portion, of lift arm 206 may be disposed within support column 104 and may be coupled to first tension bar 212. At the hinge point, hinge pin 208 of lift arm 206, both ends 207, 209 of lift arm 206 may linearly extend outward. The hinge point may be disposed within support column 104. The linear portions of lift arms 206 may be angled between the cantilevered end 207 and the opposite end 209 within support column 104. The angle A formed by the linear portions of lift arm 206 between the cantilevered end 207 and the other end 209, e.g., in a plane perpendicular to the lateral direction L, may be no less than one-hundred degrees (100°) and no more than one-hundred and seventy degrees (170°) in certain example embodiments.

Figure 3:
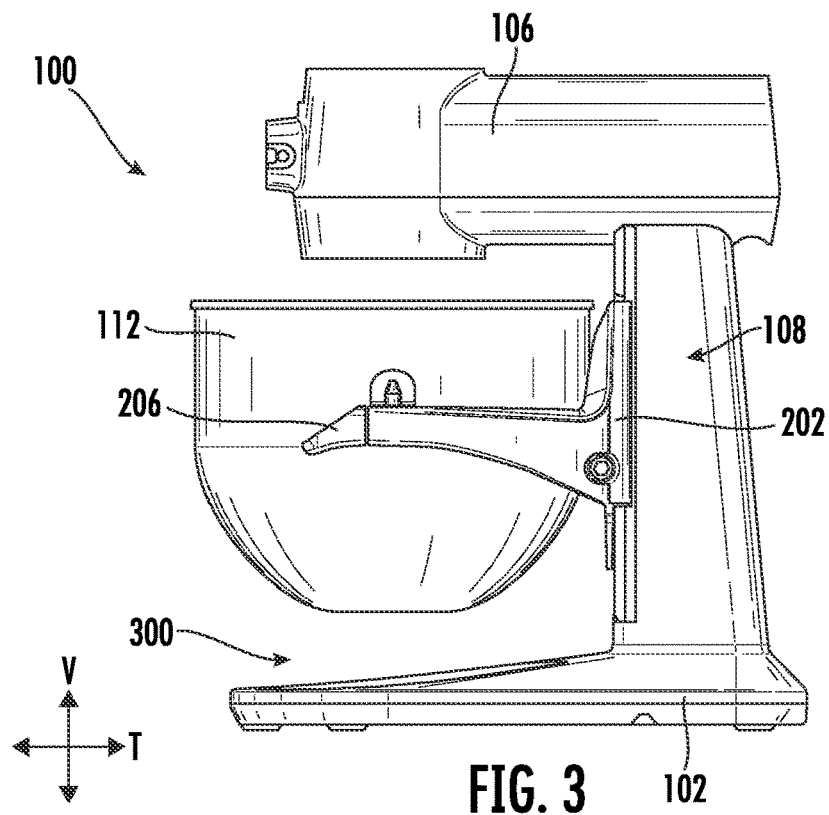
FIG. 3 provides a side view of the example stand mixer of FIG. 1 in a raised position.
Figure 4:
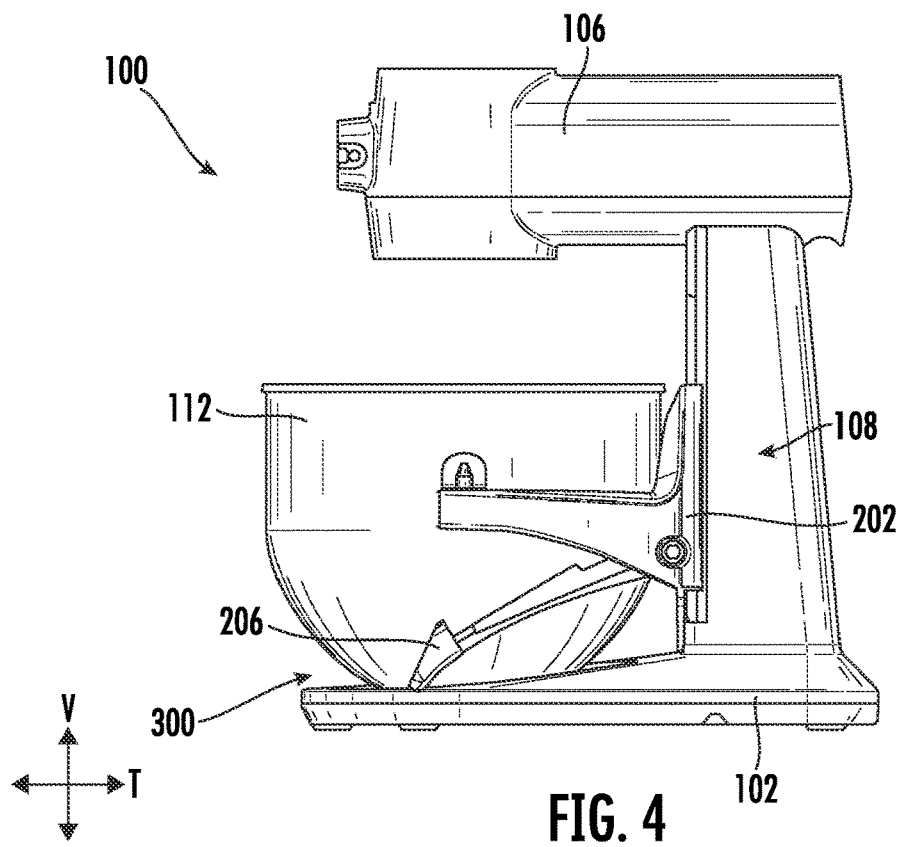
FIG. 4 provides a side view of the example stand mixer of FIG. 1 in a lowered position.

Referring now to FIGS. 3 and 4, stand mixer 100 may adjust between two positions using bowl lift framework 108. The first position, shown in FIG. 3, includes lift arm 206 parallel to the transverse direction T such that bowl carrier 202 may be vertically elevated above base 102 on slider rail 110. In particular, the first or upper position may be elevated proximate head 106 for the mixing of ingredients of bowl 112. The second position, shown in FIG. 4, includes lift arm 206 angled away relative to the transverse direction T such that bowl carrier 202 may be proximate base 102. Lift arm 206 may be disengaged by angling lift arm 206 downward toward base 102. In particular, the second or lower position may be closer to base 102 than the first position. Bowl 112 may be in the second position so that there is more space between bowl 112 and head 106 relative to the first position such that ingredients may be added to bowl 112. For example, in the first position, gap 300 of FIG. 3 may be up to five centimeters (5 cm) between base 102 and bowl 112, whereas in the second position shown in FIG. 4, gap 300 may be less than one centimeter (1 cm).

Figure 5:
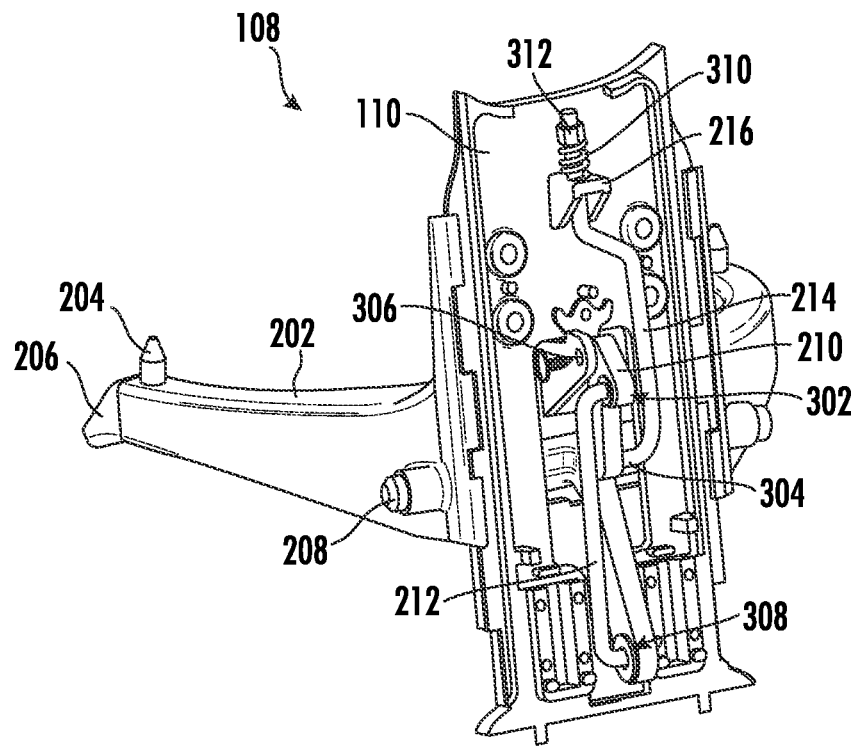
FIG. 5 provides a rear, perspective view of the bowl lift framework of FIG. 2 in the raised position.
Figure 6:
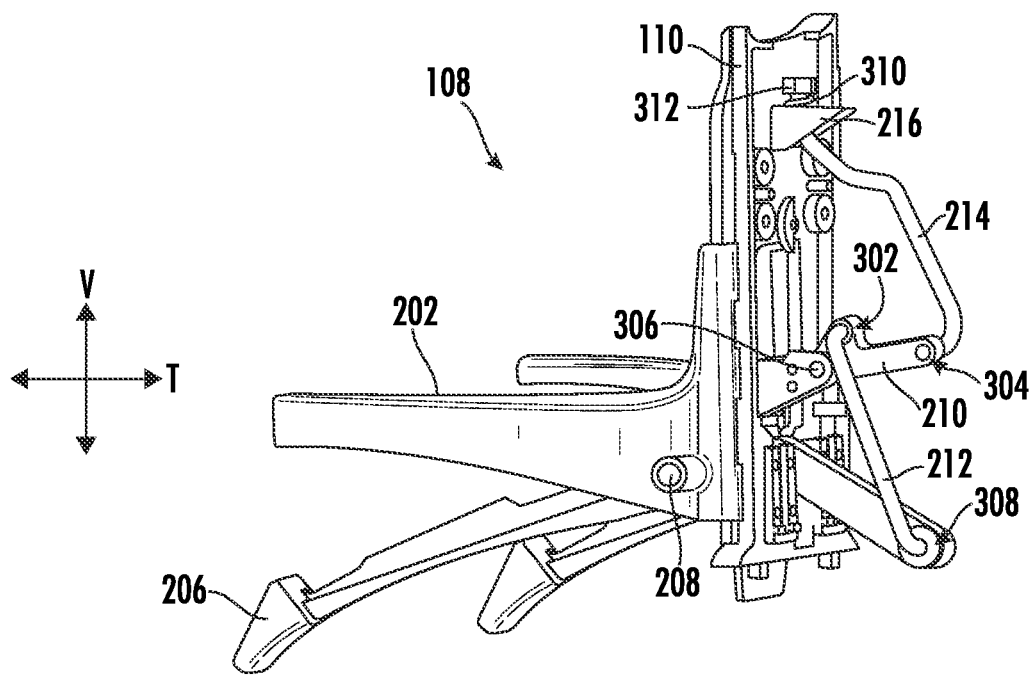
FIG. 6 provides a rear, perspective view of the bowl lift framework of FIG. 2 in the lowered position.

Referring now to FIGS. 5-7, in the operation of lift arm 206 to translate bowl 112 in the vertical direction, linkage 210 may rotate about pin 306. Pin 306 may be a fixed rotational point with respect to bowl carrier 202, e.g., pin 306 may not translate or move apart from bowl carrier 202. Specifically, lift arm 206 may couple to first tension bar 212 at a pivot point 308 of lift arm 206. Pivot point 308 may be positioned at end 209 of lift arm 206, e.g., the end 209 of lift arm 206 opposite distal end 207. First tension bar 212 may extend to linkage 210, coupling to linkage 210 at a pivot point 302. Pivot point 302 may be about two and a half centimeters (2.5 cm) from pin 306 in certain example embodiments. Pivot point 302 may be a variable position rotational point with respect to bowl carrier 202, e.g., pivot point 302 may be rotated around pin 306 moving pivot point 302 first away from bowl carrier 202 then toward bowl carrier 202 as linkage 210 continues to rotate. Second tension bar 214 may couple to linkage 210 at a pivot point 304. Pivot point 304 may be about five centimeters (5 cm)

from pin 306 in certain example embodiments. Thus, e.g., pivot point 304 may be disposed further from pin 306 than pivot point 302. Pivot point 304 may be a variable position rotational point with respect to bowl carrier 202, e.g., pivot point 304 may be rotated around pin 306 moving pivot point 304 first away from bowl carrier 202 then toward bowl carrier 202 as linkage 210 continues to rotate. As may be best seen in FIG. 2, pivot point 302 and pivot point 304 may be spaced about one centimeter (1 cm) apart with respect to the transverse direction T, and about three centimeters (3 cm) apart with respect to the vertical direction V in the up position.

For example, as lift arm 206 is actuated, the movement of lift arm 206 may be transferred through first tension bar 212 at pivot point 308, rotating linkage 210 about pin 306, rotating both pivot point 302 and pivot point 304, and thus transferring the movement to second tension bar 214 at pivot point 304. First tension bar 212 may extend through both pivot point 302 and pivot point 308, and second tension bar 214 may extend through pivot point 304. Additionally, or alternatively, a retaining ring (not shown) may be used to retain first tension bar 212 and/or second tension bar 214 in respective pivot points 302, 304, and 308. When bowl carrier 202 transitions between the first and second position, second tension bar 214 translates within a protrusion, e.g., a slider rail tab 216, on slider rail 110. On the distal end of second tension bar 214 from pivot point 304, e.g., a top portion of second tension bar 214, a spring 310 and a nut 312 may provide tension to second tension bar 214, by keeping spring 310 in compression.

As seen in FIGS. 5 and 6, in view of FIGS. 3 and 4, respectively, stand mixer 100 may be adjustable between two positions via bowl lift framework 108. As may be seen above, the first position, shown in FIG. 3, includes lift arm 206 parallel to the transverse direction T such that bowl carrier 202 may be vertically elevated above base 102 on slider rail 110. In the first position, bowl lift framework 108 may be positioned as seen in FIG. 5. For example, FIG. 5 illustrates lift arm 206 parallel to the transverse direction T, and linkage 210 is in an upper position with pivot point 304 beneath pin 306 in the vertical direction V. The second position, shown in FIG. 4, includes lift arm 206 angled away from the transverse direction T such that bowl carrier 202 may be proximate base 102. In the second position, bowl lift framework 108 may be positioned as seen in FIG. 6. For example, FIG. 6 illustrates lift arm 206 angled away from the transverse direction T, and linkage 210 is in a lower position with pivot point 304 above pin 306 with respect to the vertical direction V. Additionally or alternatively, pivot point 304 and pin 306 may be in a horizontal/transversal plane while in the second position, e.g., pivot point 304 and pin 306 may be proximate the same height with respect to the vertical direction V while in the second position.

As seen in FIG. 7, slider rail tab 216 may define slot 700, through which second tension bar 214 may extend. When bowl 112 is moving between the first and second position, second tension bar 214 may translate within slot 700 of slider rail tab 216. The distal end of second tension bar 214 from pivot point 304, may include spring 310 and nut 312. By keeping spring 310 in compression, a tension force may be transferred through second tension bar 214. In the first position, the tension provided by spring 310, in association with the position of pivot point 304, may lock bowl 112 in the first position, e.g., bowl lift framework 108 may be configured to lock in the first position. As may be best seen in FIG. 2, in the up position, pivot point 304 may be more proximate slider rail 110 than pin 306 with respect to the transverse direction T. While pivot point 304 is more proximate slider rail 110 than pin 306, the force created by spring 310 may lock bowl lift framework 108 in place until an operator actuates lift arm 206. Conversely, while in the second position, the tension provided by spring 310 may aid an operator in actuating lift arm 206.

As may be seen from the above, stand mixer 100 includes a bowl lift framework 108 that may lock into an upper position and may ease the operation of lift arm 206. Lift arm 206 may couple to first tension bar 212 at pivot point 308. First tension bar 212 may extend to linkage 210, coupling to linkage 210 at pivot point 302. Second tension bar 214 may couple to linkage 210 at pivot point 304. Through first tension bar 212, linkage 210, and second tension bar 214, in combination with spring 310, leverage may be provided to ease the raising or lowering of bowl 112.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer, comprising:
   a base;
   a support column attached to the base and extending upwardly from the base;
   a bowl lift framework extending outwardly from the support column, the bowl lift framework comprising at least two lift arms, the at least two lift arms pivotable relative to the support column, the at least two lift arms rotating a first tension bar coupled to a linkage, the linkage rotatable about a lift pin and coupled to a second tension bar;
   a head attached to an upper end of the support column and extending from the support column above the base; and
   a bowl,
   wherein the bowl lift framework is configured for vertically moving the bowl relative to the head when the lift arm pivots relative to the support column, and the bowl is held between the at least two lift arms of the bowl lift framework,
   wherein the first tension bar coupled to the linkage couples to an angled portion of the at least two lift arms, and
   wherein the stand mixer comprises a plurality of retaining rings to lock the first tension bar into the linkage and the at least two lift arms, and the second tension bar into the linkage.

2. The stand mixer of claim 1, further comprising a column rail.

3. The stand mixer of claim 2, wherein the bowl lift framework further comprises a bowl carrier slidably mounted on the column rail, the bowl carrier comprising a mounting spike, a flange of the bowl configured for receiving the mounting spike of the bowl carrier in order to removably mount the bowl on the bowl carrier.

4. The stand mixer of claim 3, further comprising a hinge pin about which the at least two lift arms are rotatably coupled to the bowl lift framework.

5. The stand mixer of claim 1, wherein the bowl lift framework immobilizes the bowl in all directions in response to actuation of the at least two lift arms.

6. The stand mixer of claim 1, wherein the bowl lift framework is adjustable between a down position and an up position by pivoting the at least two lift arms relative to the support column, the bowl lift framework configured to lock in place in the up position.

7. The stand mixer of claim 6, wherein the bowl is positioned closer to the base in the down position than in the up position.

8. The stand mixer of claim 6, further comprising a spring at a top portion of the second tension bar, the spring under compression between a nut and a protrusion defining a slot, the second tension bar extending through the slot, the second tension bar tensioned while the bowl is in the up position, locking the bowl in the up position.

9. A stand mixer, comprising:
a base;
a support column attached to the base and extending upwardly from the base;
a column rail mounted to the support column;
a head attached to an upper end of the support column and extending from the support column above the base;
a bowl comprising at least two flanges, the flanges positioned on opposite sides of the bowl; and
a bowl lift framework extending outwardly from the column rail of the support column,
wherein the bowl lift framework further comprises,
a bowl carrier slidably coupled to the column rail; and
at least two lift arms rotatably mounted to the bowl carrier;
wherein the at least two lift arms pivotable relative to the support column, the at least two lift arms rotating a first tension bar coupled to a linkage, the linkage rotatable about a pin and coupled to a second tension bar,
wherein the bowl is removably mountable on the bowl carrier between the at least two lift arms,
wherein the flanges of the bowl and the bowl carrier are configured to removably couple,
wherein the bowl lift framework is adjustable between a down position and an up position by pivoting the at least two lift arms relative to the support column, the bowl lift framework configured to lock in place in the up position, and
wherein the stand mixer comprises a spring at a top portion of the second tension bar, the spring under compression between a nut and a protrusion defining a slot, the second tension bar extending through the slot, the second tension bar tensioned while the bowl is in the up position, locking the bowl in the up position.

10. The stand mixer of claim 9, further comprising a hinge pin about which the at least two lift arms are rotatably coupled to the bowl lift framework.

11. The stand mixer of claim 9, wherein the first tension bar coupled to the linkage couples to an angled portion of the at least two lift arms.

12. The stand mixer of claim 11, further comprising a plurality of retaining rings to lock the first tension bar into the linkage and the at least two lift arms, and the second tension bar into the linkage.

13. The stand mixer of claim 9, wherein the bowl lift framework immobilizes the bowl in all directions in response to the actuation of the at least two lift arms.

14. The stand mixer of claim 9, wherein the bowl is positioned closer to the base in the down position than in the up position.

15. A stand mixer, comprising:
a base;
a support column attached to the base and extending upwardly from the base;
a bowl lift framework extending outwardly from the support column, the bowl lift framework comprising at least two lift arms, the at least two lift arms pivotable relative to the support column, the at least two lift arms rotating a first tension bar coupled to a linkage, the linkage rotatable about a lift pin and coupled to a second tension bar;
a head attached to an upper end of the support column and extending from the support column above the base; and
a bowl,
wherein the bowl lift framework is configured for vertically moving the bowl relative to the head when the lift arm pivots relative to the support column, and the bowl is held between the at least two lift arms of the bowl lift framework,
wherein the bowl lift framework is adjustable between a down position and an up position by pivoting the at least two lift arms relative to the support column, the bowl lift framework configured to lock in place in the up position, and
wherein the stand mixer comprises a spring at a top portion of the second tension bar, the spring under compression between a nut and a protrusion defining a slot, the second tension bar extending through the slot, the second tension bar tensioned while the bowl is in the up position, locking the bowl in the up position.

16. The stand mixer of claim 15, further comprising a column rail.

17. The stand mixer of claim 16, wherein the bowl lift framework further comprises a bowl carrier slidably mounted on the column rail, the bowl carrier comprising a mounting spike, a flange of the bowl configured for receiving the mounting spike of the bowl carrier in order to removably mount the bowl on the bowl carrier.

18. The stand mixer of claim 17, further comprising a hinge pin about which the at least two lift arms are rotatably coupled to the bowl lift framework.

* * * * *